United States Patent
Gutmann et al.

(10) Patent No.: US 10,336,324 B2
(45) Date of Patent: Jul. 2, 2019

(54) CALCULATION OF THE TIME TO COLLISION FOR A VEHICLE

(71) Applicant: Conti Temic Microelectronic GmbH, Nuremberg (DE)

(72) Inventors: Christian Gutmann, Frankfurt (DE); Thomas Diepolder, Isny (DE); Clemens Schnurr, Wasserburg (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 0 days.

(21) Appl. No.: 15/738,764

(22) PCT Filed: Jun. 13, 2016

(86) PCT No.: PCT/DE2016/200272
§ 371 (c)(1),
(2) Date: Dec. 21, 2017

(87) PCT Pub. No.: WO2017/000942
PCT Pub. Date: Jan. 5, 2017

(65) Prior Publication Data
US 2018/0178787 A1  Jun. 28, 2018

(30) Foreign Application Priority Data

Jun. 30, 2015  (DE) .................. 10 2015 212 250

(51) Int. Cl.
*B60W 30/095* (2012.01)
*G05D 1/00* (2006.01)
(Continued)

(52) U.S. Cl.
CPC ........ *B60W 30/0956* (2013.01); *B60W 30/08* (2013.01); *B60W 30/095* (2013.01);
(Continued)

(58) Field of Classification Search
CPC .......... B60W 30/095; B60T 7/22; B60T 7/12; G08G 1/16; G05D 1/00; B61K 31/00
See application file for complete search history.

(56) References Cited

U.S. PATENT DOCUMENTS 6,044,321 A * 3/2000 Nakamura ......... B60K 31/0008
180/179
8,527,172 B2 9/2013 Moshchuk et al.
(Continued)

FOREIGN PATENT DOCUMENTS

| DE | 102005036049 A1 | 2/2007 |
| DE | 102008063579 A1 | 9/2009 |
| DE | 102011014081 A1 | 9/2012 |
| DE | 102013212473 A1 | 12/2014 |
| EP | 1475764 | 11/2004 |

OTHER PUBLICATIONS

International Search Report and Written Opinion dated Oct. 31, 2016 from corresponding International Patent Application No. PCT/DE2016/200272.
(Continued)

*Primary Examiner* — Yuri Kan

(57) ABSTRACT

Based on the assumption that a preceding vehicle does not brake to a halt, but only reduces its speed for a certain time, an improved TTC (Time To Collision) can be calculated. By means of the difference between the TTC with braking to a halt and the improved TTC, a probability for the occurrence of a hypothesis concerning the further behavior of the preceding vehicle can be reduced.

10 Claims, 4 Drawing Sheets

Prior art

(51) Int. Cl.
*G08G 1/16* (2006.01)
*B60W 30/08* (2012.01)
*G01S 13/58* (2006.01)
*G01S 13/93* (2006.01)
*B60W 50/06* (2006.01)
*B60W 50/14* (2012.01)
*G01S 17/93* (2006.01)

(52) U.S. Cl.
CPC ............ *B60W 50/06* (2013.01); *B60W 50/14* (2013.01); *G01S 13/58* (2013.01); *G01S 13/931* (2013.01); *G08G 1/166* (2013.01); *B60W 2420/42* (2013.01); *B60W 2420/52* (2013.01); *B60W 2550/30* (2013.01); *G01S 17/936* (2013.01); *G01S 2013/9346* (2013.01); *G01S 2013/9353* (2013.01); *G01S 2013/9367* (2013.01)

(56) References Cited

U.S. PATENT DOCUMENTS

| | | | | |
|---|---|---|---|---|
| 8,560,200 | B2* | 10/2013 | Maruyama | G08G 1/22 180/170 |
| 2004/0085197 | A1* | 5/2004 | Watanabe | B60T 7/22 340/435 |
| 2005/0131590 | A1 | 6/2005 | Kuge et al. | |
| 2006/0145463 | A1 | 7/2006 | Kazuyoshi et al. | |
| 2014/0032094 | A1 | 1/2014 | Heinrichs-Bartscher et al. | |
| 2016/0185325 | A1* | 6/2016 | Ike | B60T 7/22 701/70 |
| 2016/0293010 | A1* | 10/2016 | Kamijo | G08G 1/166 |

OTHER PUBLICATIONS

Office Action dated Jan. 11, 2016 from corresponding German Patent Application No. 10 2015 212 250.6.

* cited by examiner

Prior art    Fig. 1

CALCULATION OF THE TIME TO COLLISION FOR A VEHICLE

BACKGROUND

The invention relates to a device and a method for calculating a collision time with a preceding vehicle.

PRIOR ART

Various driver assistance systems such as, for example, emergency braking assistance or adaptive cruise control (ACC) use the time to collision (TTC) with an obstacle in order to control individual functions.

The variables required for calculating the TTC are established, for example, by means of environment detection sensors such as radar or lidar or camera sensor units and/or radio-based C2X sensors, which provide information regarding a vehicle's surroundings. This information is sent, for example, by other vehicles or the external infrastructure (road signs, beacons, servers, etc.).

A collision prevention and warning system is known, for example, from U.S. Pat. No. 8,527,172 B2, which determines a TTC with a target vehicle from the speeds, the acceleration and the distance of two vehicles.

BRIEF SUMMARY

The object of the present invention is to improve the calculation of the TTC. This object is achieved by a method and a device in accordance with the independent claims. Further advantageous configurations form the subject of the dependent claims.

According to the invention, a first collision time with a preceding vehicle is determined by means of the following steps: establishing a distance from the preceding vehicle, establishing a relative speed of the preceding vehicle with respect to the egovehicle, establishing a deceleration of the preceding vehicle, assuming a duration of the deceleration of the preceding vehicle; and determining the first collision time with the preceding vehicle from the relative speed, the distance, the deceleration and the assumed duration of the deceleration.

In this case, the assumption is advantageously made that a deceleration is not maintained until the preceding vehicle comes to a halt. The preceding vehicle only decelerates for a certain period of time, for example, during a turning maneuver and then leaves the vehicle's lane. The preceding vehicle behaves in a similar way in the case of a speed limit, since the speed is simply reduced there to the required level.

When the preceding vehicle is braking, the assumed, hypothetical behavior of the preceding vehicle in each case is that it is turning or reducing its speed. Each hypothetical behavior is evaluated with a probability of occurrence, in order to make a selection as to whether the preceding vehicle wishes to turn or simply wishes to reduce its speed. Once this selection has been made, the egovehicle reacts to the probable, hypothetical behavior of the preceding vehicle.

In another configuration of the invention, the distance from the preceding vehicle, the relative speed of the preceding vehicle with respect to the egovehicle and the deceleration of the preceding vehicle can be established again during the course of the assumed duration of the deceleration, a further duration of the deceleration of the preceding vehicle can be assumed, and a current collision time with the preceding vehicle can be determined from the relative speed, the distance, the deceleration and the further duration of the deceleration.

As a result, the collision time is advantageously determined again with the current values for distance, relative speed and deceleration, as well as a further assumed period of time. This advantageously makes it possible to continuously calculate the collision time.

A probability of occurrence for a hypothetical behavior of the preceding vehicle can preferably be assumed.

In one advantageous configuration of the invention, an additional collision time can be determined from the distance and the relative speed of the preceding vehicle with respect to the egovehicle, and a correction value, which corrects the probability of occurrence for the hypothetical behavior of the preceding vehicle, can be calculated from the additional collision time and the first or the current collision time. As a rule, the probability of occurrence is reduced.

The probability of occurrence for the hypothetical behavior of the preceding vehicle can be advantageously varied by means of the correction value. The correction value makes it possible to adjust the reaction precisely, depending on the situation, to the hypothetical behavior of the preceding vehicle.

The reaction to an assumed hypothetical behavior of the preceding vehicle can be delayed up to a certain threshold in a particularly advantageous way by means of the correction value.

In particular, the correction value for small differences between the known and the improved TTC is close to 1, i.e. the probability of occurrence is only slightly reduced. On the other hand, in the case of greater differences, the correction factor is close to 0 so that the probability of occurrence for the hypothetical behavior is reduced by the very small correction factor and little account is taken of this hypothetical behavior. Consequently, the reactions to the respective hypothetical behavior can be restricted or prevented respectively.

In another preferred configuration of the invention, the assumed duration of the deceleration can depend on an assumed speed reduction of the preceding vehicle. The assumed duration of the deceleration is advantageously calculated from the quotient of the assumed, lowered speed and established level of the deceleration of the preceding vehicle. The assumed speed reduction describes the speed difference of the preceding vehicle before and after the braking. In particular, uniform, constant braking is assumed so that the speed difference results from the duration of the braking at constant deceleration.

The assumed duration of the deceleration can preferably depend on a level of the deceleration or the distance of the preceding vehicle.

A short duration of the deceleration can be advantageously presumed in the case of high deceleration and a long duration of the deceleration can be advantageously presumed in the case of low deceleration. The distance can also be considered in a particularly advantageous way so that the assumed duration of the deceleration is selected such that it is long enough and sufficiently short.

In another preferred configuration of the invention, the deceleration can be less than 10 m/s$^2$ or greater than 3 m/s$^2$. Up to this maximum deceleration it can advantageously be presumed that the braking of the preceding vehicle will stop before it comes to a halt. Furthermore, the minimum deceleration of 3 m/s$^2$ allows a tolerance with respect to measurement inaccuracies.

The assumed duration of the deceleration of the preceding vehicle can preferably be at least 1 second. The collision time can be advantageously calculated again with the current values during this time.

In another preferred configuration of the invention, the collision time or the correction value can be used for the reaction of the egovehicle, in particular a warning message to a driver. Advantageously, the egovehicle does not therefore react to the assumed hypothetical behavior of the preceding vehicle. For example, no warning message is therefore issued to the driver since this would, in all probability, turn out to be a false warning.

The reaction of the egovehicle, in particular a warning message to a driver, can preferably be delayed depending on the first or current collision time or the correction value. Advantageously, the probability of occurrence is updated by the continued determination of the improved TTC and the warning message is delayed until such time as the probability of occurrence for the assumed hypothetical behavior of the preceding vehicle is sufficiently large. More advantageously, a braking of the egovehicle can also be performed as a reaction, which makes comfortable braking possible in particular.

According to the invention, a device comprises a detecting unit for detecting the distance and the relative speed of a preceding vehicle, a determining unit for determining the deceleration of the preceding vehicle and a calculating unit for calculating the improved TTC.

The detecting unit can preferably be configured as radar or camera equipment.

BRIEF DESCRIPTION OF THE DRAWINGS

Description of Figures and Embodiment Examples

DETAILED DESCRIPTION

Figure 1:
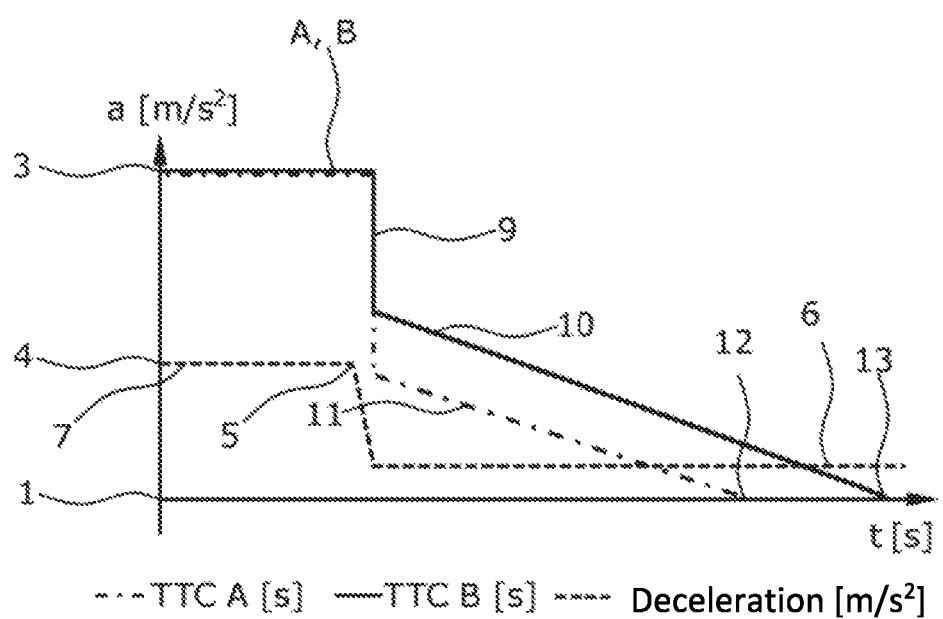
FIG. 1 shows, by way of example, the course of two TTCs at various distances from a preceding vehicle.

FIG. 1 shows an exemplary course of two TTCs (times to collision) with a preceding vehicle as the obstacle. The deceleration of the preceding vehicle is plotted on the y-coordinate, the x-coordinate represents the timeline. The preceding vehicle is recognized at origin 1 of the coordinate system. The course of two TTCs A, B over time is shown by way of example. The solid line B and the dotdashed line A each show one TTC, wherein the distance from the preceding vehicle is greater in the case of TTC B than in the case of TTC A at detection time 3. The dashed line 7 indicates the deceleration of the preceding vehicle, which is zero at detection time 4. At time 5, the preceding vehicle suddenly decelerates sharply and maintains this deceleration 6. The relative speed with respect to the preceding vehicle reduces so that the values for TTC A, B drop 9. Since the preceding vehicle is maintaining the deceleration, TTC A, B decreases linearly 10, 11 during the further course up to a possible collision or halt 12, 13. Both TTCs run parallel, wherein the collision is more likely to occur in the case of TTC A than in the case of TTC B due to the shorter distance.

Figure 2:
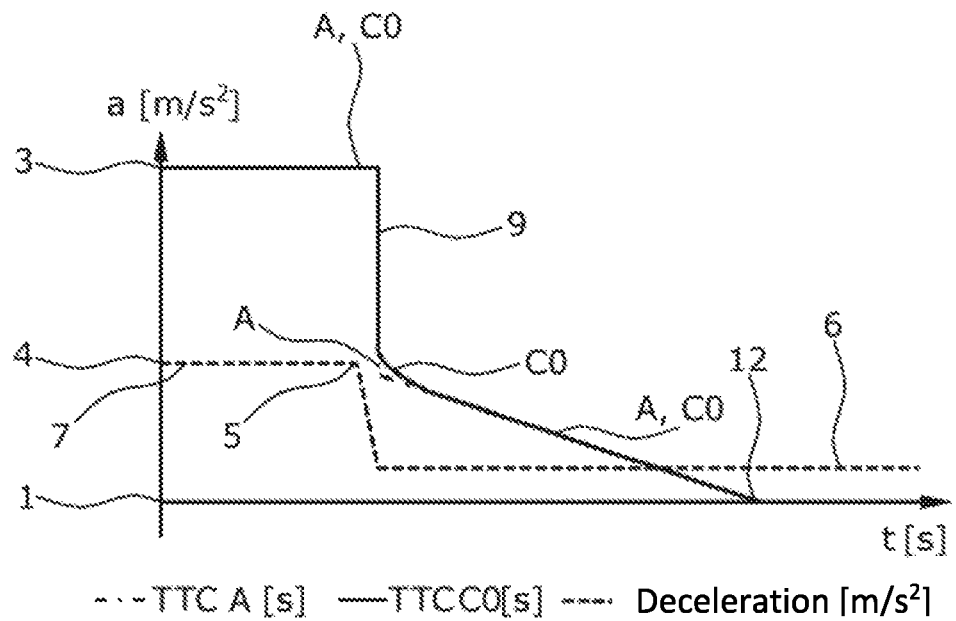
FIG. 2 shows the course of an improved TTC at a short distance from the preceding vehicle.

FIG. 2 shows the improved course of TTC C0 compared with the known course of TTC A at a short distance from the preceding vehicle at detection time 3 up to the collision 12. The deceleration of the preceding vehicle is plotted on the y-coordinate, the x-coordinate represents the timeline. The preceding vehicle is recognized at origin 1 of the coordinate system. As shown in FIG. 1, the dashed line 7 indicates the deceleration of the preceding vehicle, which is zero at detection time 4. At time 5, the preceding vehicle suddenly decelerates sharply and maintains this deceleration 6. By way of comparison with the prior art, the course of TTC A (as a dotdashed line) from FIG. 1 is also shown. Immediately following the braking 5 of the preceding vehicle, the relative speed reduces so that the values for TTC A and TTC C0 drop 9.

The improved calculation of TTC C0 only differs minimally from the known TTC A at short distances from the preceding vehicle. The two courses of the TTCs are therefore identical except for the time shortly after the braking 5.

Figure 3:
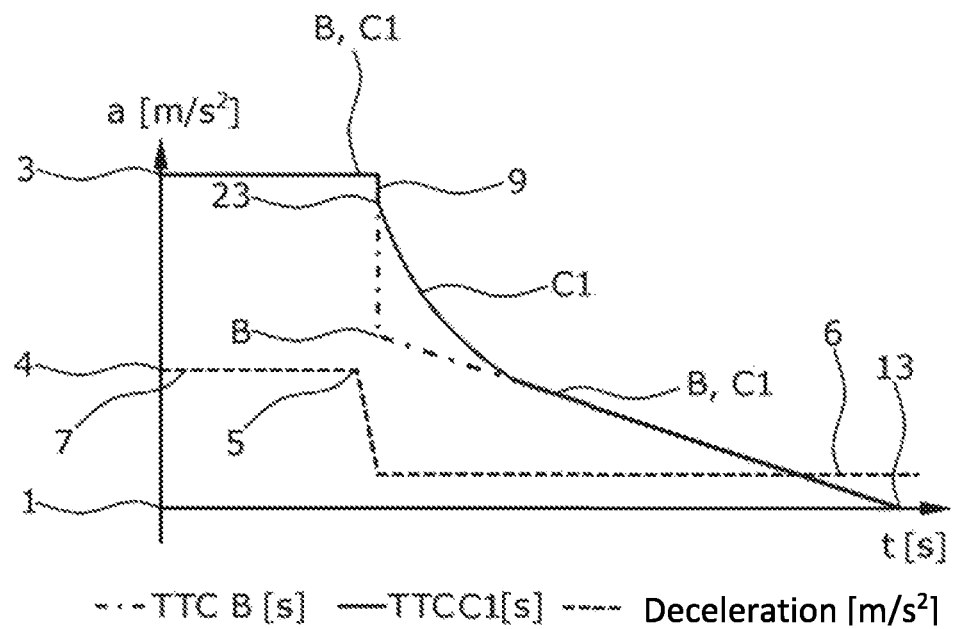
FIG. 3 shows the course of an improved TTC at a large distance from the preceding vehicle.

FIG. 3 shows the improved course of TTC C1 compared with the known course of TTC B at a large distance from the preceding vehicle at detection time 3 up to the collision 13. The deceleration of the preceding vehicle is plotted on the y-coordinate, the x-coordinate represents the timeline. The preceding vehicle is recognized at the origin 1 of the coordinate system. As in FIGS. 1 and 2, the dashed line 7 shows the deceleration of the preceding vehicle, which is zero at detection time 4. At time 5, the preceding vehicle decelerates and maintains this deceleration 6. By way of comparison with the prior art, the course of TTC B (as a dotdashed line) from FIG. 1 is also shown. The relative speed reduces immediately after the braking 5 of the preceding vehicle so that the values for TTC B and TTC C1 drop 9.

The improved calculation of TTC C1 differs at large distances from the preceding vehicle immediately 23 following the braking 9 of the preceding vehicle. The improved TCC C1 drops more slowly compared to TTC B. The reduced drop of TTC C1 is based on the assumption that the preceding vehicle is indeed decelerating, but this deceleration will only last a short period of time and will not be sustained up to a halt.

Figure 4:
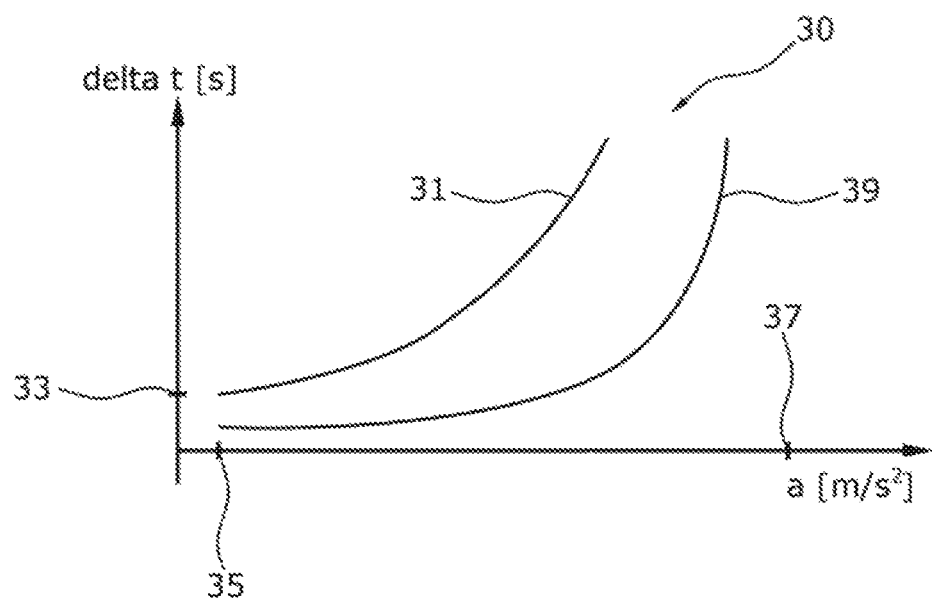
FIG. 4 shows a family of curves for the assumed duration of the braking depending on the level of deceleration of the preceding vehicle and the distance.

FIG. 4 shows two curves of a family of curves 30 by way of example, by means of which curves an improved TCC is calculated. A current deceleration of the preceding vehicle is established and a speed reduction of the preceding vehicle is assumed from the change in speed of the preceding vehicle, which is calculated from the relative speed. The assumption about the level of the speed reduction is based on the established level of the deceleration and the distance of the preceding vehicle. The period of time needed by the preceding vehicle to achieve the assumed speed reduction can be calculated from the assumed speed reduction and the established deceleration. Since the calculated period of time for the deceleration processes is based on an assumed speed reduction, the period of time is also only an assumption. The point 37 in FIG. 4 represents the zero point at which no deceleration takes place.

The curve 31 shows the assumed duration of the deceleration at a distance of 25 m. It is assumed, for example, that the preceding vehicle reduces its speed by 10 m/s at a distance of 25 m. Depending on the established deceleration of the preceding vehicle, the assumed duration of the deceleration is presented in FIG. 4. At a deceleration of 10 m/s² 35, the preceding vehicle needs 1s 33 in order to reduce its speed by the assumed value. At the end of this assumed period of deceleration, the current values (deceleration, distance) are determined once more and a new assumption is made about the duration of the deceleration, or the level of the speed reduction in accordance with the family of curves 30.

A further curve 39 shows the assumed duration of the deceleration of the preceding vehicle at a distance of 100 m depending on the established deceleration.

At small distances (for example 25 m in the case of curve 31) a large speed reduction is assumed, which at low deceleration results in a longer assumed duration of the deceleration. Due to the short distance, the long assumed duration of the deceleration results in a TTC calculation as if the braking were maintained to a halt. At short distances, the improved calculation of the TTC therefore approaches the known TTC calculation which originates from deceleration to a halt.

On the other hand, at large distances 39, a small speed reduction is assumed, which results in a brief assumed duration of the deceleration. The large distance from the preceding vehicle therefore makes it possible to calculate the TTC again once the assumed duration of the deceleration has elapsed. As it is assumed that the deceleration only lasts a brief time and, subsequently, no deceleration takes place, this results in an increase in the TTC and a delayed triggering of reactions to the otherwise lower TTC. The lower TTC would arise if the preceding vehicle were to decelerate to a halt, therefore a very long duration of the deceleration would be presumed.

At the end of the assumed duration of the deceleration, the TTC is recalculated with the then newly established values. As a result, in the event of a deceleration to a halt, the improved TTC approaches the known TTC. In other words, the longer the deceleration continues, the more the improved calculation approaches the known calculation.

Figure 5:
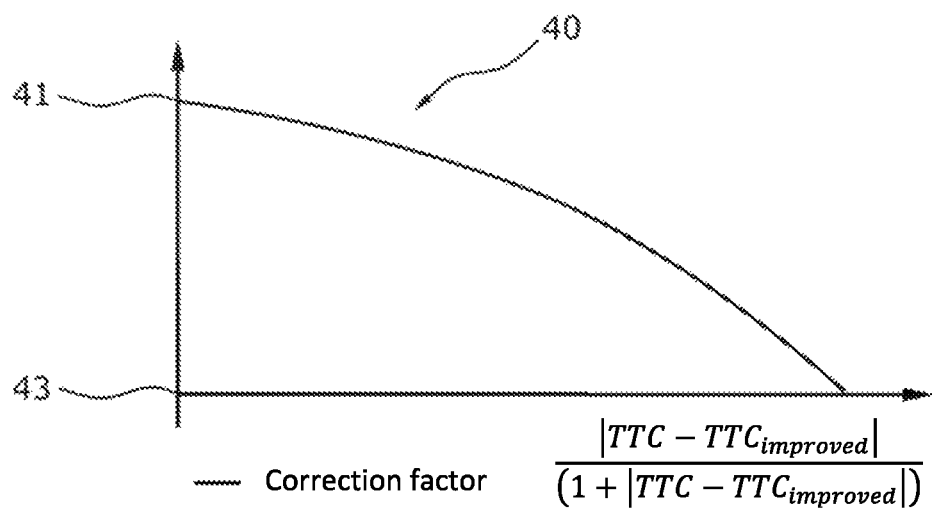
FIG. 5 shows the exemplary course of a correction factor for adjusting the probability of the occurrence of an assumed hypothesis concerning the future behavior of the preceding vehicle.
Figure 6:
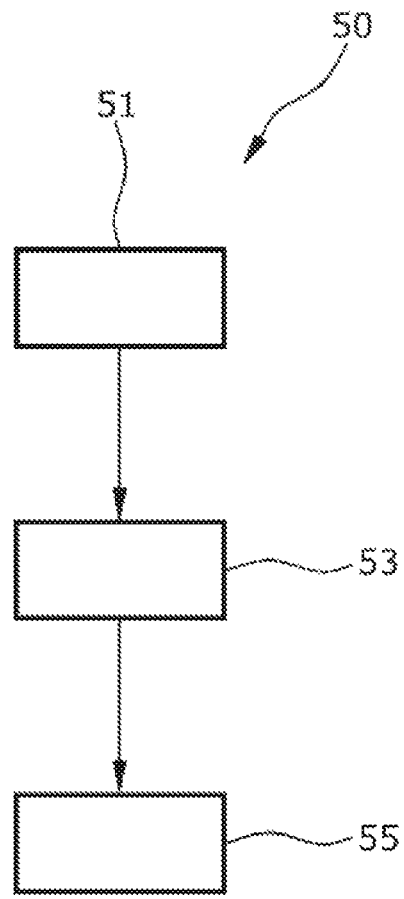
FIG. 6 shows a device for calculating the improved TCC.

FIG. 5 shows the characteristic curve 40 of a correction factor, which is calculated from the known TTC and the improved TTC, for example, by means of the following equation.

$$\frac{|TTC - TTC_{improved}|}{(1 + |TTC - TTC_{improved}|)}$$

The correction factor is then used to reduce the probability of the hypothesis concerning the further behavior of the preceding vehicle. The correction factor 41 is close to 1 for small differences between the known TTC and the improved TCC, i.e. the probability is only slightly reduced. In the case of greater differences, the probability is, on the other hand, suppressed by the small value 43 and consequently the reactions to the hypothesis are restricted or prevented respectively.

The device 50 in FIG. 5 comprises a radar sensor 51 which measures a distance and a relative speed of a preceding vehicle. In the process the radar sensor 51 exploits the Doppler effect. A determining unit 53 determines the deceleration of the preceding vehicle from the relative speed and the variation thereof over time. A calculating unit 55 calculates an improved TTC based on the measured and determined information.

The invention claimed is:

1. A method for an egovehicle for determining a first collision time with a preceding vehicle comprising:
   establishing a distance from the preceding vehicle;
   establishing a relative speed of the preceding vehicle with respect to the egovehicle;
   establishing a deceleration of the preceding vehicle;
   assuming a duration of the deceleration of the preceding vehicle such that the assumed duration of the deceleration is less than a period of time for which the deceleration of the preceding vehicle would need to continue in order to cause the preceding vehicle to come to a halt;
   determining the first collision time with the preceding vehicle from the relative speed, the distance, the deceleration and the assumed duration of the deceleration.

2. The method according to claim 1, wherein
   the distance from the preceding vehicle, the relative speed of the preceding vehicle with respect to the egovehicle and the deceleration of the preceding vehicle are established again during the assumed duration of the deceleration;
   a further duration of the deceleration of the preceding vehicle is assumed such that the assumed further duration of the deceleration is less than a period of time for which the deceleration of the preceding vehicle would need to continue in order to cause the preceding vehicle to come to a halt; and
   a current collision time with the preceding vehicle is determined from the relative speed, the distance, the deceleration and the further duration of the deceleration.

3. The method according to claim 1, wherein
   a probability of occurrence for a hypothetical behavior of the preceding vehicle is assumed, the hypothetical behavior of the preceding vehicle being selected from a group consisting of turning out of a current lane of travel and reducing its speed, but not stopping, within the current lane of travel;
   in addition, in particular,
   an additional collision time is determined from the distance and the relative speed of the preceding vehicle with respect to the egovehicle, and
   a correction value, which corrects the probability for the hypothetical behavior of the preceding vehicle, is calculated from the additional collision time and the first collision time.

4. The method according to claim 1, wherein
   the assumed duration of the deceleration depends on an assumed speed reduction of the preceding vehicle, wherein the assumed duration of the deceleration is calculated from a quotient of an assumed lowered speed of the preceding vehicle and the established level of the deceleration of the preceding vehicle, wherein the assumed speed reduction of the preceding vehicle refers to a speed difference of the preceding vehicle before and after braking, wherein uniform constant braking is assumed so that the speed difference results from a duration of the braking at a constant deceleration.

5. The method according to claim 4, wherein
   the level of the assumed speed reduction is less than 10 m/s and greater than 3 m/s.

6. The method according to claim 1, wherein
   the assumed duration of the deceleration depends on a level of the deceleration or the distance of the preceding vehicle.

7. The method according to claim 1, wherein
the assumed duration of the deceleration of the preceding vehicle is at least 1 second.
8. The method according to claim 3, wherein
the collision time or the correction value is used for the reaction of the egovehicle, in particular a warning message to a driver.
9. The method according to claim 8, wherein
the reaction of the egovehicle, in particular a warning message to a driver, is delayed depending on the first or current collision time or the correction value.
10. A device, comprising:
a detecting unit, in particular radar or camera equipment, for detecting a distance and a relative speed of a preceding vehicle;
a determining unit for determining a deceleration of the preceding vehicle; and
a calculating unit for performing operations comprising:
establishing the distance from the preceding vehicle;
establishing the relative speed of the preceding vehicle with respect to the egovehicle;
establishing the deceleration of the preceding vehicle;
assuming a duration of the deceleration of the preceding vehicle such that the assumed duration of the deceleration is less than a period of time for which the deceleration of the preceding vehicle would need to continue in order to cause the preceding vehicle to come to a halt;
determining a first collision time with the preceding vehicle from the relative speed, the distance, the deceleration and the assumed duration of the deceleration.

* * * * *